(12) United States Patent
Bruce

(10) Patent No.: US 9,469,983 B2
(45) Date of Patent: Oct. 18, 2016

(54) BEAM CAP SYSTEM

(71) Applicant: Ryan W. Bruce, Santa Cruz, CA (US)

(72) Inventor: Ryan W. Bruce, Santa Cruz, CA (US)

(73) Assignee: Roofscreen Mfg., Inc., Santa Cruz, CA (US)

( * ) Notice: Subject to any disclaimer, the term of this patent is extended or adjusted under 35 U.S.C. 154(b) by 0 days.

(21) Appl. No.: 14/939,352

(22) Filed: Nov. 12, 2015

(65) Prior Publication Data

US 2016/0130797 A1    May 12, 2016

Related U.S. Application Data

(60) Provisional application No. 62/078,869, filed on Nov. 12, 2014.

(51) Int. Cl.
*E04D 13/00* (2006.01)
*E04B 1/41* (2006.01)

(52) U.S. Cl.
CPC ............. *E04B 1/40* (2013.01); *E04D 13/00* (2013.01)

(58) Field of Classification Search
CPC ....... E04D 3/405; E04G 21/26; E04G 17/14; E04B 7/18
USPC .......................................... 52/710, 146, 147
See application file for complete search history.

(56) References Cited

U.S. PATENT DOCUMENTS

| | | | |
|---|---|---|---|
| 3,742,659 A | 7/1973 | Drew | |
| 3,878,655 A | 4/1975 | Toth et al. | |
| 5,244,264 A | 9/1993 | Woodard | |
| 5,289,662 A * | 3/1994 | Castle | E04D 3/405 52/287.1 |
| 5,459,967 A | 10/1995 | Bodtker | |
| 5,843,327 A * | 12/1998 | Lindgren | E04G 11/087 249/210 |
| 5,862,637 A | 1/1999 | Bruce | |
| 6,205,719 B1 | 3/2001 | Bruce | |
| 6,237,293 B1 * | 5/2001 | Gembala | E04D 13/0431 52/302.6 |
| 6,343,439 B1 | 2/2002 | Rutledge | |
| 6,378,256 B1 * | 4/2002 | Gembala | E04D 3/405 52/301 |
| 6,543,187 B1 | 4/2003 | Menzies | |
| 6,758,015 B2 | 7/2004 | Clasen et al. | |
| 6,782,668 B2 | 8/2004 | Bruce | |
| 7,797,883 B2 | 9/2010 | Tarbell et al. | |
| 7,921,607 B2 | 4/2011 | Thompson et al. | |
| 8,001,739 B1 * | 8/2011 | Inzeo | E04D 3/405 52/198 |
| 8,015,759 B1 * | 9/2011 | Bruce | E04D 13/00 248/514 |
| 8,776,454 B2 | 7/2014 | Zuritis | |
| 2002/0178671 A1 * | 12/2002 | Gembala | E04D 3/405 52/302.6 |
| 2003/0009959 A1 * | 1/2003 | Bruce | G09F 19/22 52/146 |
| 2003/0051428 A1 * | 3/2003 | Kay | E04D 3/405 52/566 |
| 2005/0235578 A1 * | 10/2005 | Heidler, Jr. | E04D 3/405 52/58 |
| 2013/0192154 A1 * | 8/2013 | Kelly | E04D 3/405 52/300 |

* cited by examiner

*Primary Examiner* — Brian Mattei
*Assistant Examiner* — Gisele Ford
(74) *Attorney, Agent, or Firm* — Thomas Schneck

(57) ABSTRACT

A system for attachment to beams in which at least two U-shaped cleats are secured over a beam. A cap is attached to the cleats, the cap enclosing the U-shaped cleats, and preventing rain from entering the beam through fasteners used to secure the cleats. On the underside of the cap, stop tabs space the top of the cap from the beam. On the upperside of the cap, T-slots form channels with a gap opening. These channels may be used to attach equipment to the beam.

13 Claims, 5 Drawing Sheets

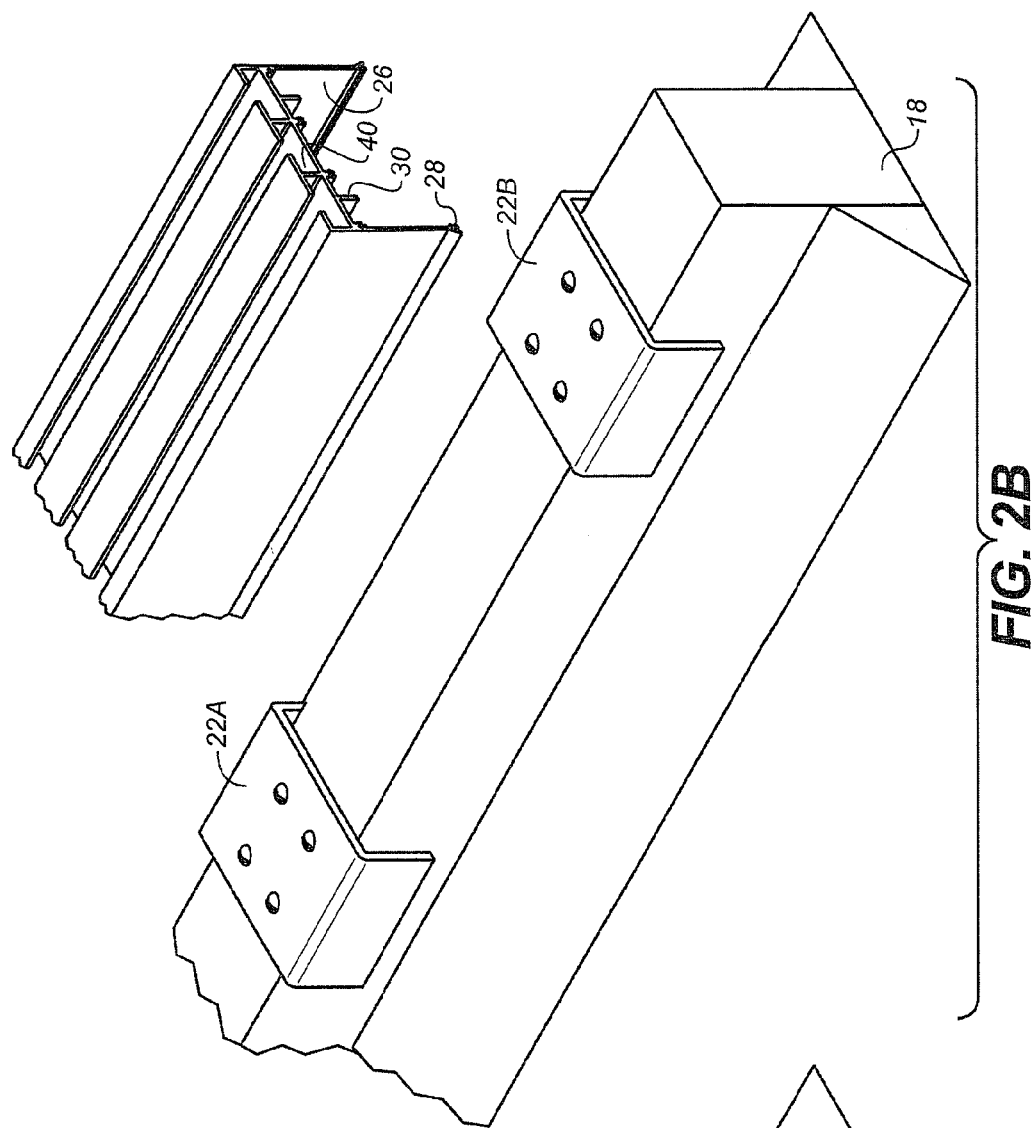
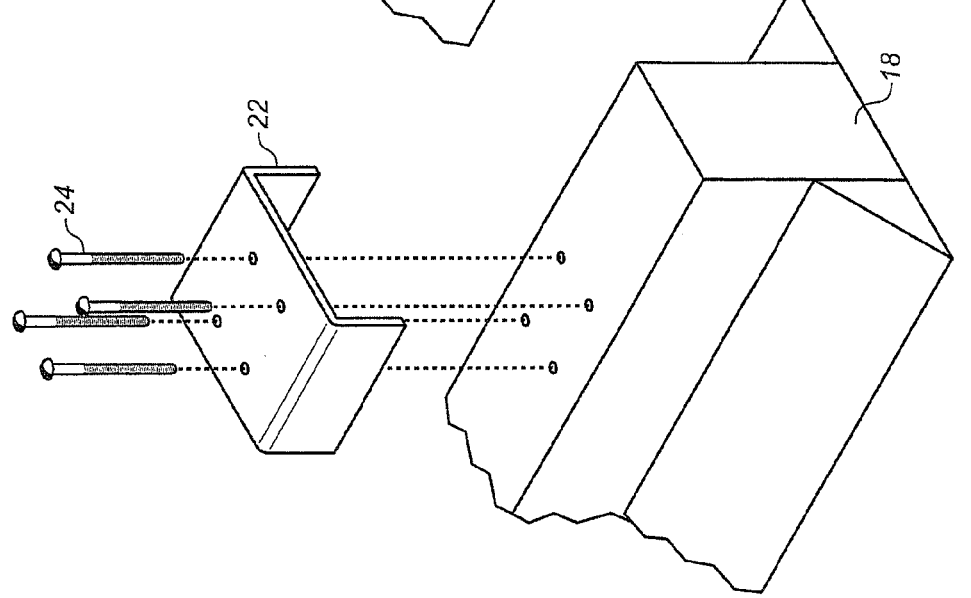
FIG. 2B
FIG. 2A

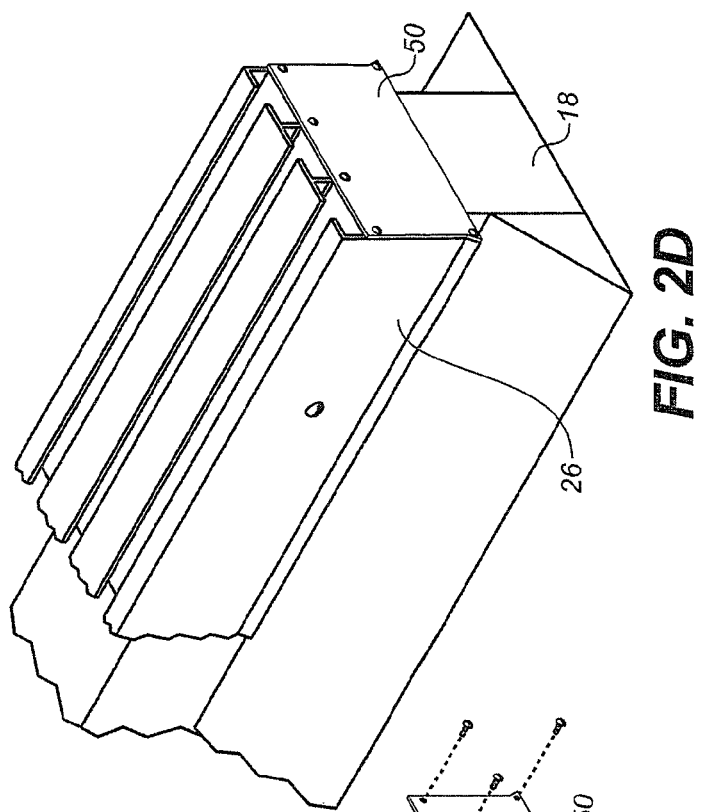
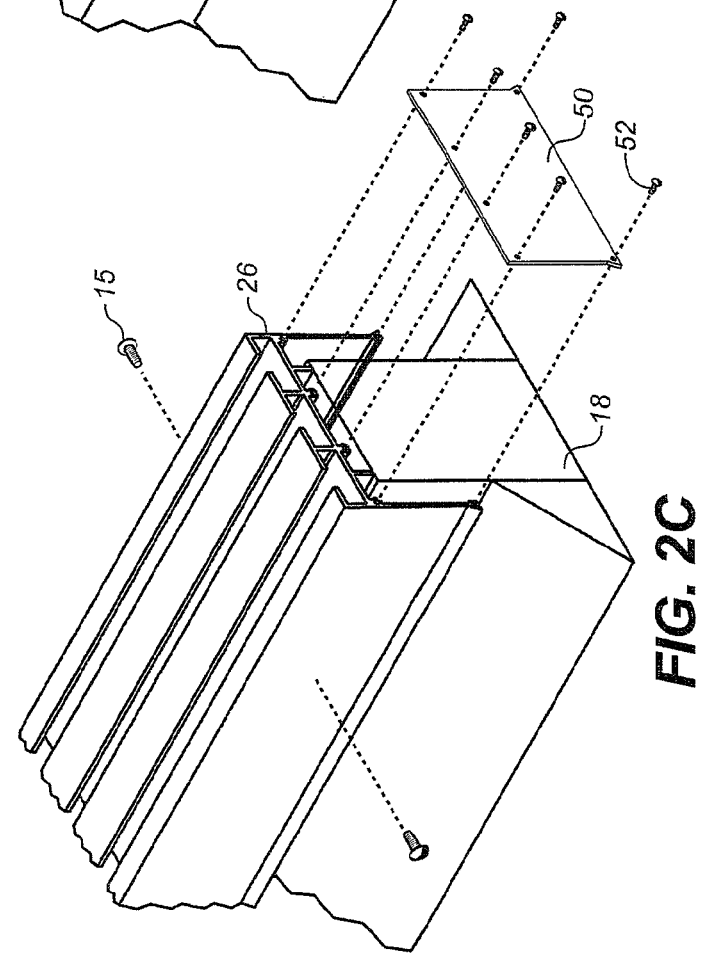
FIG. 2D
FIG. 2C

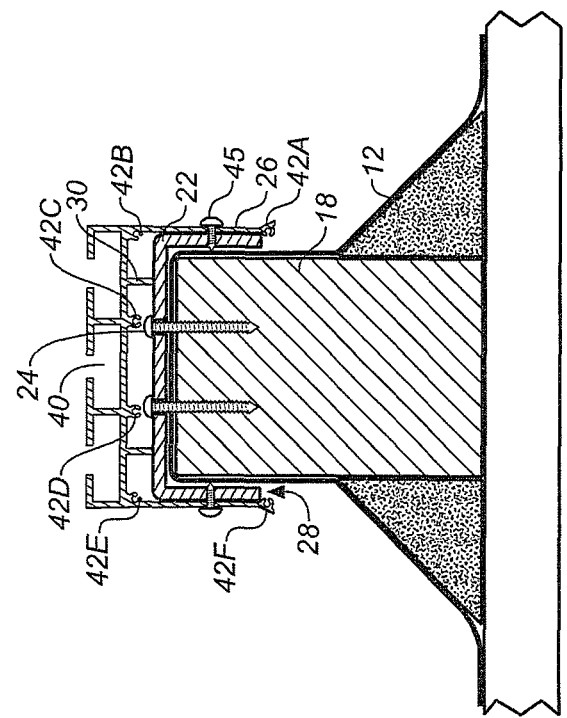
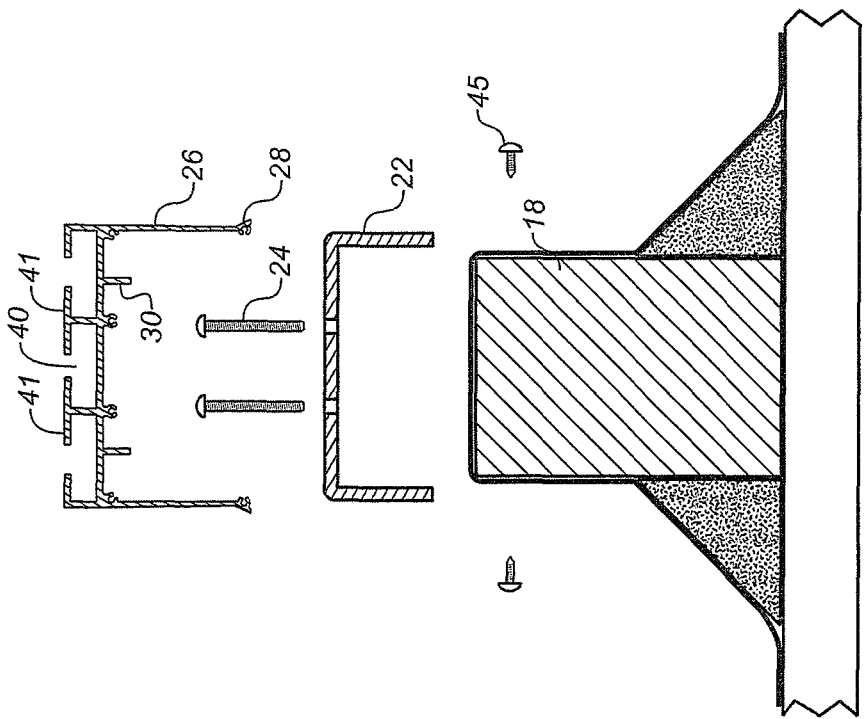

BEAM CAP SYSTEM

CROSS REFERENCE TO RELATED APPLICATION

This application claims priority from U.S. provisional application Ser. No. 62/078,869 filed Nov. 12, 2014.

TECHNICAL FIELD

The present invention relates to devices for mounting structures onto beams and more specifically, to leak resistant mountings onto beams.

BACKGROUND

Flat roof buildings often have roof top mounted equipment. This can include heating, ventilation and air conditioning (HVAC) equipment, solar panels, or panels for screening roof top equipment. For example, one such roof panel system is described in U.S. Pat. No. 5,862,637 to Ryan Bruce. This system used cylindrical mounts supporting a beam. Weatherproofing around each mount keeps the system watertight, and act in conjunction with the cylindrical mounts to prevent leaks. A plurality of triangular braces provides the support for screening panels. U.S. Pat. No. 6,205,719 also to Ryan Bruce, provides an improvement through the use of frames assembled from tubular beams held together by pivotable clamps. The use of a frame using pivotable clamps allows the roof top panel to be more easily positioned.

An alternative way to secure such screen panels or other equipment is through the use of a sleeper beam (typically wood) which is secured to a roof using bolts. Braces on the sides of sleepers add strength to the beam.

In alternative beam systems, girder type beams can be used for holding clips, which in turn can be used to attach a solar panel. For example, U.S. Pat. No. 8,776,454 to Zuritis discloses a girder type rail. The bottom of this rail can include one or more flanges. Holes on these flanges allow mounting to a U-bolt. The top of the rail includes a channel into which a clip may be secured. This clip is then used to attach solar panels to the rail.

In any system, care must be taken when a bolt or other fastener is secured through the roof. Proper flashing and sealing is required to prevent leaks. However the integrity of the roof still may be compromised. This is especially true of sleeper beams.

Additional devices for attaching to a beam in a manner that helps to prevent leaks would be useful.

SUMMARY

An apparatus for securing items to a beam, such as a roof beam, is detailed. Such a beam has a planar top surface, and parallel opposed side surfaces depending from the top surface. The apparatus includes at least two U shaped cleats that may be secured on the beam. The cleats conform to the shape of the beam, each cleat having a top surface parallel to the beam top surface and each cleat having dependent sides parallel to the opposed sides of the beam. Over at least two cleats is secured a cap. The cap has a top section parallel to the tops of at least two cleats. The cap has dependent sides that are parallel to the cleat side sections. On the interior of the cap on the top surface are cap internal stop tabs. These are positioned on the lower side of the of the cap top section.

The stop tabs space the cap top surface from the top of the cleats. On the upper side of the cap top surface are a plurality of elongate, parallel T-slots, which run the length of the top section. Channels are formed between the adjacent T-sections. A fastener can be inserted into a channel and extend upwardly from the channel.

In one embodiment fasteners extend through the cap side sections and into the cleat sides, securing the cap in place.

BRIEF DESCRIPTION OF THE DRAWINGS

FIG. 2A is a side perspective view of a cleat positioned above a sleeper beam with fastener bolts.

FIG. 2B is a side perspective view of a sleeper beam showing two cleats mounted on the beam and a cap section positioned over the two cleats.

FIG. 2C is a side perspective view of a cap section mounted on a sleeper beam with a beam end cap and end cap fasteners shown detached from the cap section.

FIG. 2D is the side perspective view of FIG. 2C with the cap section mounted on the sleeper beam and the end cap secured to the end of the cap section.

FIG. 3A is a cross sectional exploded view showing the sleeper beam, the cleat over the sleeper beam, two bolts which attach the cleat to the sleeper beam, and the cap section over the cleat.

FIG. 3B is a side cross section view of the elements of FIG. 3A, with the elements assembled onto the sleeper beam.

DETAILED DESCRIPTION

Beam mounted equipment is common in a number of structures. For example, roof screens have been utilized to screen from view various roof top equipment, such as air conditioners, ventilation equipment, pipes, electrical boxes and other roof mounted equipment. To install such screens generally have used wood "sleeper" beams bolted onto a flat roof. A frame using wood or sheet metal members is then mounted onto the sleeper beam.

The disclosed embodiments provide a beam cap system that allows water tight mounting onto a beam. Structures can then be mounted on the beam using channels on the cap.

Figure 1:
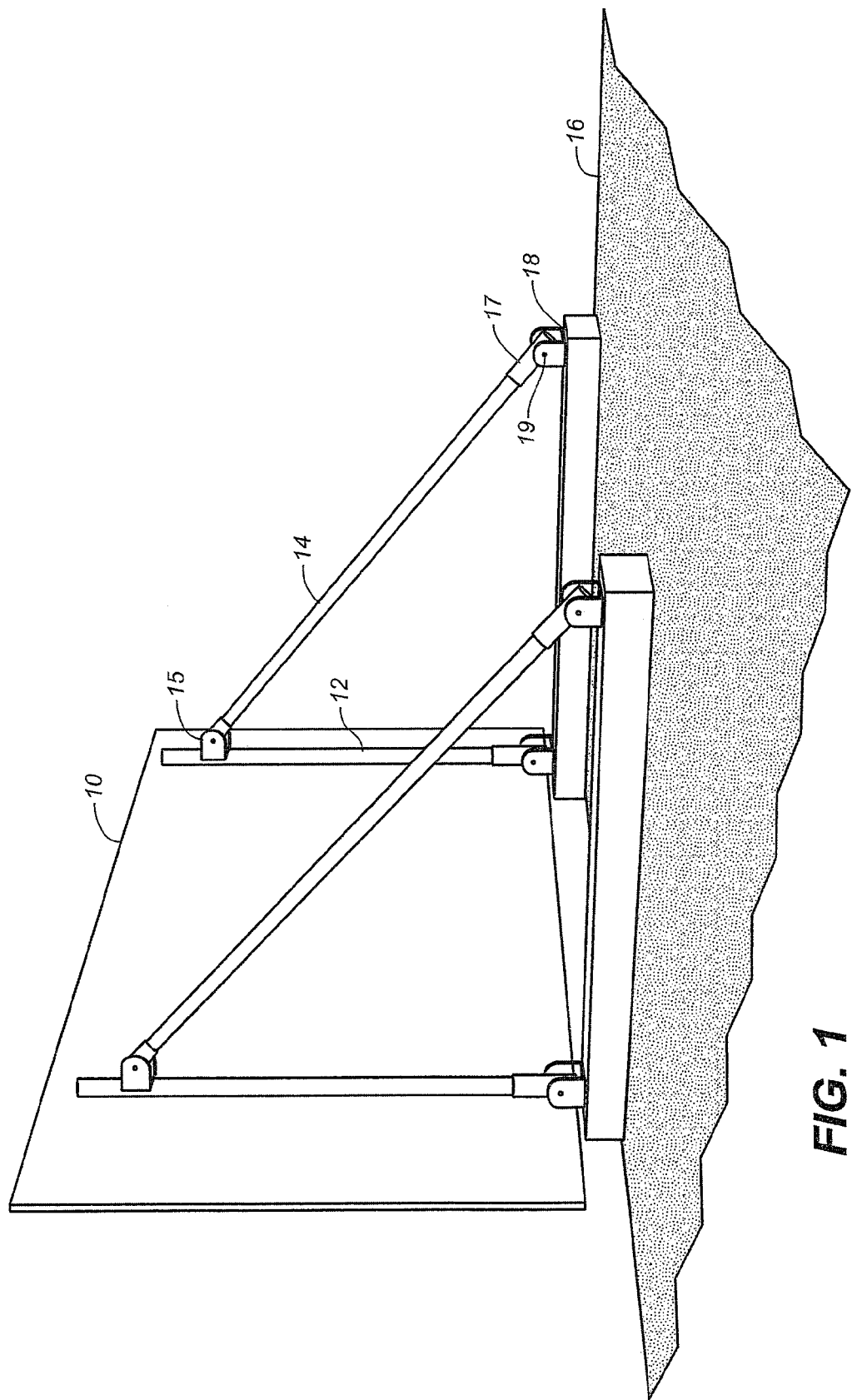
FIG. 1 is a side perspective view of a panel for screening view of equipment mounted on a roof. The panel is shown supported by a tubular mounting system mounted on sleeper beams on a flat roof.

With reference to FIG. 1, a screening panel is shown having tubular members 12 extending across the width of the screen 10. The tubular members may be made of round, galvanized steel tubing or other durable, resilient material. A slider coupling 15 allows a pivoting attachment to diagonal tubular member 14. Diagonal tubular member 14 connects to terminal coupling 17, which is pivotably mounted on mounting 19.

Mounting 19 is attached to sleeper beam 18 on roof 16. One advantage of the use of sleeper beams is that the roof screen is not mounted directly on the flat roof, and will allow flow of rain water.

FIG. 2A is a view of the sleeper beam 18 with a cleat 22 secured by fasteners 24. The cleat is generally U-shaped, with a top surface parallel to the top surface of the sleeper beam and the dependent sides parallel to the sides of the sleeper beam. The cleat preferably has a snug fit over the sleeper beam.

FIG. 2B shows two cleats 22a, 22b mounted onto a sleeper beam 18 by fasteners. This allows a cap 26 to be mounted over the cleats is shown. Stop tabs 30 on the underside of cap 26 space and position the cap, allowing cap 26 to slide over cleats 22a and 22b, with clearance for the heads of the fasteners that secure cleats 22a, 22b to sleeper beam 18. In addition to providing sufficient clearance, stop tabs 30 reduce surface area that contacts the cleat, allowing the cap to slice over the cleats with reduced friction. Lip 28 on the downwardly depending sides of cap 26 is fit under the downwardly depending sides of cleats 22a, 22b. This secures cap 26 in place.

T-slots 41 are positioned on the top of cap 26. These T-spots define a channel 40 having a gap opening at the top of channel 40. This allows placement of a fastener within channel 40. For example, the shaft of a bolt can be placed into the channel, with the head of the bolt secured by the T-slots 41.

With reference to FIGS. 2C and 2D, the sleeper beam 18 is shown with cap 26 over the beam. The cap 26 is mounted on cleats (shown in FIGS. 2A, 2B). Fasteners 15 are secured through the cap and into the cleats. An end cap 50 is secured to the end of cap 26 by fasteners 52. This seals the end of cap 26 and prevents water entering from the open side on the side of cap 26. This keeps the top of sleeper beam 18 dry. Thus, even though the fasteners used to secure the cleats in the sleeper beam have to extend into sleeper beam 18, during rain or other events where moisture is present.

With reference to FIGS. 3A, 3B, the sleeper beam 18 shows the attachment of the cleat 22 and the cap 26. The cleat 22 is mounted by fasteners 24 to beam 18.

Fasteners 45 extend through cap 26 and into cleat 22 without extending into beam 18. This fastener 45 prevents the cap from slipping and sliding relative to the position of the cleat. Because the cleat is secured onto the beam, the cap is effectively also secured to the beam by fastener 45, without having to have cap 26 directly bolted onto the beam. This aids in insuring that the cap is installed while ensuring that the roof remain watertight. This prevents leaks in the roof. This becomes increasingly important, because the installation of additional equipment on the cap makes repair of the roof difficult. Lip 28 on cap 26 fits under of the downwardly depending sides of cleat 22. This configuration allows the cleat to be secured to the beam, and the cap to prevent water (e.g. from rain) to degrade the beam.

Stop tabs 30 on cap 26 act in conjunction with lip 28 to position the cap 26 over the beam. Holes 42a-42f are used to mount the end cap as was shown in FIGS. 2C and 2D. Slots 40 on the cap allow mounting of additional equipment onto the roof.

Figure 4:
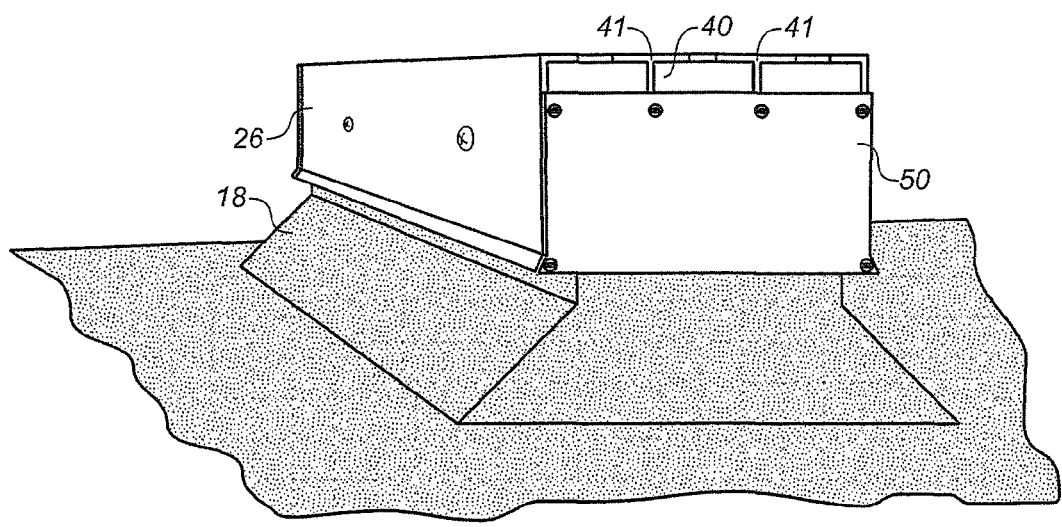
FIG. 4 is a side perspective view of the cap section mounted on a beam with an end cap secured over the open side end of the cap section.

As shown in FIG. 4, the cap 26 is secured on the top of sleeper beam 18. End cap 50 seals the beam within the cap. T-slots 41 define channel 40.

Figure 5:
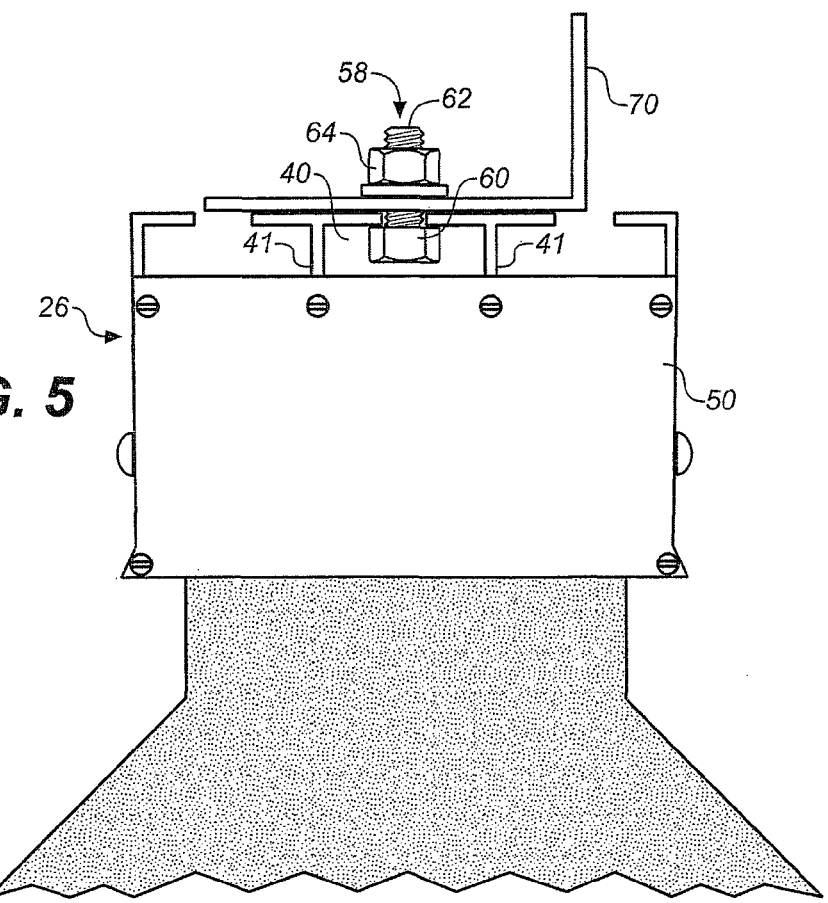
FIG. 5 is an end view of a beam with a mounted cap section and a bolt securing a beam mounted structure.

As seen in FIG. 5, end cap 50 seals the open end of cap 26 while still allowing channel 40 formed by T-slots 41 to be accessible. A bolt can be slid into channel 40, with the shaft 62 of the blot extending through the gap between T-slots 41. The head 60 of the fastener is secured on one side of, the gap, and a nut 64 is secured onto the shaft 62 on the other side of the opening. The shaft may also pass through attachment item 70, which is thereby mounted to the roof. This can be the mount for a solar panel, a roof screening panel, or other equipment.

I claim:

1. Apparatus for securing items to a beam of the type having a planar beam top surface and parallel, opposed, beam side surfaces depending from the beam top surface comprising:
    at least two U-shaped cleats secured onto the beam, said cleats having a cleat top surface parallel to said beam top surface, and dependent cleat sides parallel to said opposed side surfaces of said beam;
    an elongate cap having a cap top section parallel to the cleat top surface and dependent cap side sections, said cap side sections fitting snugly over said cleat sides;
    a plurality of elongate cap internal stop tabs positioned on a lower side of said cap top section such that said top cap section is spaced from said beam when said cleats are disposed over the beam and said cap is positioned over said cleats; and
    a plurality of elongate, parallel T-slots on an upper side of said cap top section running a length of said cap top section forming channels between adjacent T-slots with an upwardly open gap between adjacent T-slots;
    whereby fasteners can reside in the channels with fastener portions extending upwardly through the gap and other fastener portions retained in the channels.

2. The apparatus of claim 1, further including fasteners extending through said cap side sections and into said cleat sides but not extending into said beam side surfaces.

3. The apparatus of claim 1, further including an end cap secured over an open end of said elongate cap, said end cap leaving said channels between adjacent T-slots open end accessible.

4. The apparatus of claim 1, wherein said channels includes at least 3 channels.

5. The apparatus of claim 1, wherein a terminal edge of each of said cap side sections includes a lip that fits under a terminal edge of a respective one of said cleat sides.

6. An apparatus for securing items to a sleeper beam comprising:
    at least two cleats mounted to said sleeper beam by a plurality of fasteners;
    an elongate cap having a cap top section and fitting over said at least two cleats;
    a means on a lower, interior side of said cap top section for spacing an underside of said cap top section from said cleats, said means for spacing allowing clearance for tops of said plurality of fasteners; and
    a means on an upper, exterior side of said cap top section for mounting items to the exterior side of said elongate cap.

7. The apparatus of claim 6, further including a means for securing said cap to said cleats without penetrating the sleeper beam.

8. The apparatus of claim 6, further including a means for sealing an end of said cap.

9. The apparatus of claim 6, further including a lip on terminal edges of said cap, said lip fitting against terminal edges of said cleat.

10. The apparatus of claim 6, wherein said means for mounting items includes a plurality of mounting channels on the upper, exterior side of said cap top section.

11. The apparatus of claim 10, wherein said means for mounting items further comprises a plurality of parallel t-slots and said plurality of mounting channels are formed between said t-slots.

12. The apparatus of claim 11, wherein said means for spacing the underside of said cap top section from said cleats includes internal stop tabs.

13. The apparatus of claim 6, wherein said means for spacing the underside of the cap top section from said cleat and said means for mounting items are integral with the cap.

\* \* \* \* \*